US012130215B2

(12) United States Patent
Scavo et al.

(10) Patent No.: US 12,130,215 B2
(45) Date of Patent: Oct. 29, 2024

(54) ELECTROSTATIC PROBE FOR HANDLING OR POSITIONING AN INSECT SPECIMEN

(71) Applicant: The Johns Hopkins University, Baltimore, MD (US)

(72) Inventors: Laura Elizabeth Schiffrin Scavo, Bethesda, MD (US); Adam C. Goodwin, Baltimore, MD (US)

(73) Assignee: The Johns Hopkins University, Baltimore, MD (US)

( * ) Notice: Subject to any disclaimer, the term of this patent is extended or adjusted under 35 U.S.C. 154(b) by 0 days.

(21) Appl. No.: 17/753,550

(22) PCT Filed: Aug. 31, 2020

(86) PCT No.: PCT/US2020/048744
§ 371 (c)(1),
(2) Date: Mar. 7, 2022

(87) PCT Pub. No.: WO2021/050312
PCT Pub. Date: Mar. 18, 2021

(65) Prior Publication Data
US 2024/0044757 A1    Feb. 8, 2024

Related U.S. Application Data

(60) Provisional application No. 62/900,194, filed on Sep. 13, 2019.

(51) Int. Cl.
G01N 1/36    (2006.01)
A01M 1/02   (2006.01)

(52) U.S. Cl.
CPC ............... *G01N 1/36* (2013.01); *A01M 1/026* (2013.01)

(58) Field of Classification Search
CPC ........... G01N 1/36; A01M 1/026; A01M 5/00; A01M 5/02; A01M 23/00; A01M 23/38
USPC .......... 73/863, 863.01, 864.91, 865.8, 866.5, 73/432.1; 43/58; 414/1, 788, 754, 776, 414/779; 294/209, 137, 212, 219; 81/488; 279/128
See application file for complete search history.

(56) References Cited

U.S. PATENT DOCUMENTS

| 7,470,518 B2 | 12/2008 | Chiu et al. |
| 2016/0185549 A1* | 6/2016 | Roska ............... B65H 20/02 |
| | | 226/102 |

FOREIGN PATENT DOCUMENTS

| CN | 104582478 B | 4/2015 |
| JP | 2010279270 A | 7/2013 |
| KR | 1020120017039 A | 2/2012 |

(Continued)

OTHER PUBLICATIONS

International Search Report and Written Opinion issued in Application No. PCT/US2020/048744; Dated Nov. 12, 2020, 7 Pages.

*Primary Examiner* — Robert R Raevis
(74) *Attorney, Agent, or Firm* — Harrity & Harrity, LLP

(57) ABSTRACT

An electrostatic probe for positioning an insect specimen is disclosed herein. The electrostatic probe may include an ion generator, a handling end, and a controller. The controller may be configured to: activate the ion generator to produce a electrostatic field at the handling end, wherein the electrostatic field is to attract a specimen to the handling end or hold the insect specimen at the handling end, and discharge the electrostatic field to cause the insect specimen to be released from the handling end.

20 Claims, 10 Drawing Sheets

(56) References Cited

FOREIGN PATENT DOCUMENTS

RU 2447657 C1 4/2012
RU 157123 U1 11/2015

\* cited by examiner

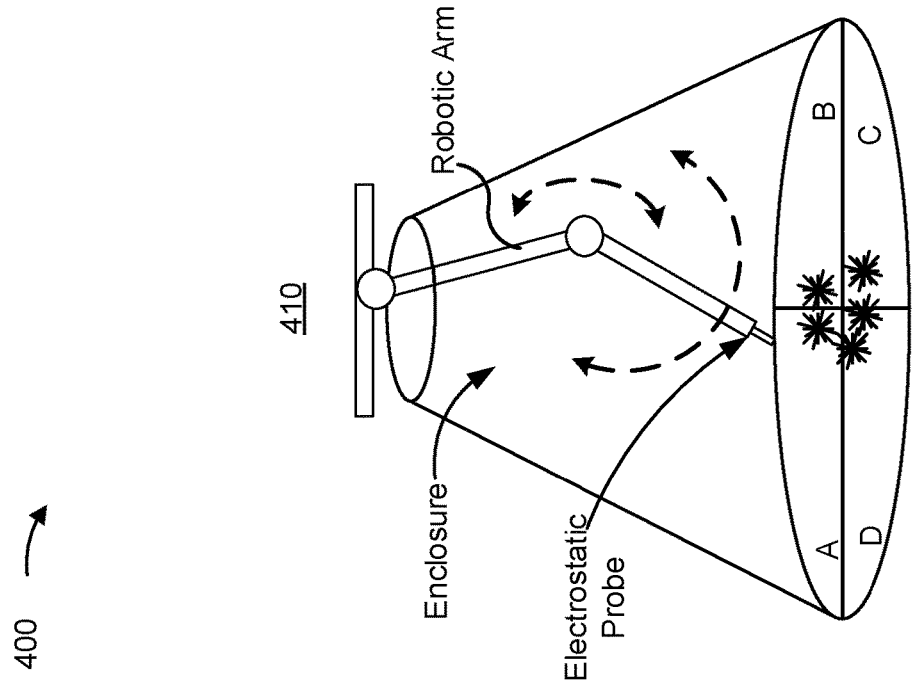
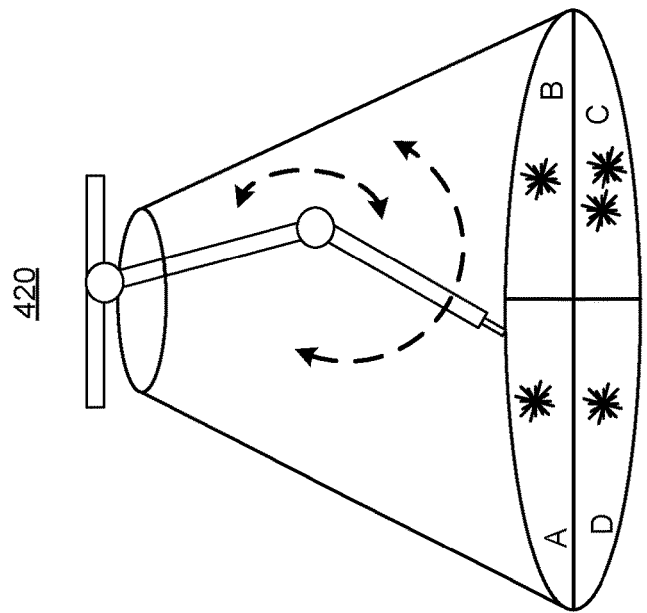
FIG. 4

ELECTROSTATIC PROBE FOR HANDLING OR POSITIONING AN INSECT SPECIMEN

CROSS-REFERENCE TO RELATED APPLICATIONS

This Patent Application is a 371 national stage of PCT Application PCT/US/2020/048744 filed on Aug. 31, 2020, entitled "ELECTROSTATIC PROBE FOR HANDLING OR POSITIONING AN INSECT SPECIMEN," which claims priority to United States Provisional Patent Application No. 62/900,194, filed on Sep. 13, 2019, and entitled "ELECTROSTATIC PROBE FOR HANDLING OR POSITIONING AN INSECT SPECIMEN," both of which are hereby expressly incorporated by reference herein.

GOVERNMENT LICENSE RIGHTS

This invention was made with Government support under AID-OAA-F-16-00091 awarded by the Agency for International Development. The Government has certain rights in the invention.

BACKGROUND

Insect traps are used for surveillance of insects and analysis of characteristics of populations of the insects. Insect specimens are collected for lab analysis to enable a statistical analysis to be performed based on the insect specimens. The statistical analysis can indicate characteristics of populations of insects in a particular region or area to enable individual and/or governmental bodies to treat the region or area appropriately. In some cases, a lab analysis may include handling the insect specimen to reposition, move, transfer, or relocate the insect specimen.

SUMMARY

According to some implementations, an electrostatic probe, for positioning an insect specimen, may include an ion generator; a handling end; and a controller configured to: activate the ion generator to produce a electrostatic field at the handling end, wherein the electrostatic field is to attract a specimen to the handling end or hold the insect specimen at the handling end and discharge the electrostatic field to cause the insect specimen to be released from the handling end.

According to some implementations, a method may include detecting the insect specimen on or within a trap mechanism of the insect trap; controlling, based on detecting the insect specimen on the trap mechanism, an electrostatic probe to adjust a position of the insect specimen by at least one of: generating a electrostatic field to cause the insect specimen to be positioned at a position associated with the electrostatic probe or discharging the electrostatic field to adjust the position of the insect specimen; and performing an action associated with the electrostatic probe adjusting the position of the insect specimen.

According to some implementations, a device may include one or more memories; and one or more processors, communicatively coupled to the one or more memories, configured to: detect the insect specimen on or within a trap mechanism of the insect trap; control, based on detecting the insect specimen on the trap mechanism, an electrostatic probe to adjust a position of the insect specimen by at least one of: generating a electrostatic field to cause the insect specimen to be positioned at a position associated with the electrostatic probe or discharging the electrostatic field to adjust the position of the insect specimen; and perform an action associated with the electrostatic probe adjusting the position of the insect specimen.

According to some implementations, a non-transitory computer-readable medium may store one or more instructions. The one or more instructions, when executed by one or more processors of a device, may cause the one or more processors to: detect the insect specimen on or within a trap mechanism of the insect trap; control, based on detecting the insect specimen on the trap mechanism, an electrostatic probe to adjust a position of the insect specimen by at least one of: generating a electrostatic field to cause the insect specimen to be positioned at a position associated with the electrostatic probe or discharging the electrostatic field to adjust the position of the insect specimen; and perform an action associated with the electrostatic probe adjusting the position of the insect specimen.

BRIEF DESCRIPTION OF THE DRAWINGS

FIG. 4 is a diagram of an example implementation described herein.

DETAILED DESCRIPTION

Figure 1A:
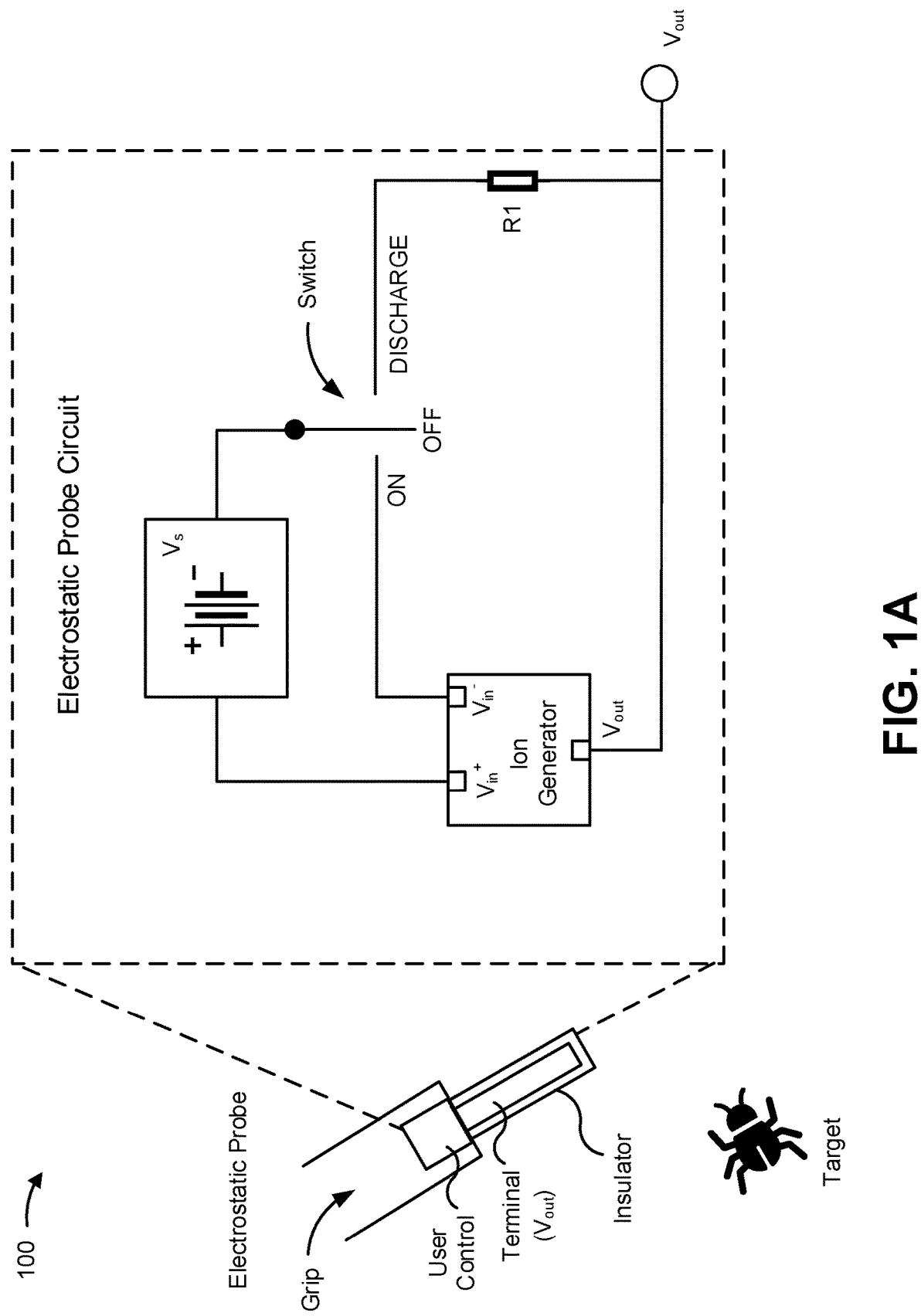
FIGS. 1A and 1B are diagrams of one or more example implementations described herein.

The following detailed description of example implementations refers to the accompanying drawings. The same reference numbers in different drawings may identify the same or similar elements.

Insect specimen analysis typically requires an individual to handle (e.g., pick up, hold, adjust, move, reposition, and/or the like) an insect specimen (e.g., a live or deceased insect). Due to the nature and physiology of certain insects, insect specimens are generally very fragile. Accordingly, using previous techniques, the individual typically handles the insect specimen using his or her own hand and/or relatively small tools, such as tweezers, scoops, and/or the like. However, such tools can be awkward for the individual to use and/or the individual and/or tools can still be prone to causing damage to the insect specimen (e.g., due to being too abrasive relative to the fragility of the insect specimen).

Furthermore, insect surveillance generally involves placing one or more insect traps throughout a region to collect insect specimens. Collection and analysis of the insect specimens generally involves a time consuming and; or complex process of individuals physically accessing the insect traps, collecting the insect specimens, and returning the insect specimens to a lab for analysis. Such an analysis can involve identifying a species of the insect, estimating a population of the insects in the region, identifying any diseases associated with the insects, and/or the like. Accordingly, such a relative time consuming and complex process may involve the use of several resources (e.g., consumable resources used in traveling to each of the insect traps in the region), hardware resources (e.g., wear and tear on vehicles and/or machines to transport the insect specimens), and/or the like. Furthermore, due to the amount of time consumed during such a process, collection of the insect specimens may occur relatively infrequently (e.g., weekly, biweekly, monthly, and/or the like), thus lessening sampling of the insect specimens. Therefore, the relatively low sampling of the insect specimens may result in analyses performed on the insect specimen to be relatively inaccurate. Furthermore, due to the relatively long periods of time between collecting samples, harmful characteristics of the insect population may be detected too late as irreparable harm from the insects may have already been done between collections of the samples. This can result in harm to an ecosystem of the region (e.g., spread of disease to plants and animals), destruction of consumable produce of the region (e.g., fruits, vegetables, and/or the like), and/or the like. An insect trap analysis system can enable remote detection, surveillance, and/or collection of specimens using a trap system to capture an insect, and/or enables a trap system controller to detect an insect specimen, gather information (e.g., from images of the insect specimen) associated the insect specimen using one or devices of the trap system, and perform one or more actions based on the gathered information.

According to some implementations described herein, an electrostatic probe can be used to handle and/or position an insect specimen for analysis. The electrostatic probe may be configured to generate an electrostatic field to attract an insect specimen to the electrostatic probe (e.g., to a handling end of the electrostatic probe) and hold the insect specimen on or against the electrostatic probe. The electrostatic probe may then discharge the electrostatic field to release the insect specimen. For example, the electrostatic probe may be configured to be a handheld probe that permits an individual to handle the insect specimen without damaging the insect specimen. Additionally, or alternatively, one or more electrostatic probes may be configured within an insect trap to enable insect specimens to be positioned (or repositioned) and/or sorted within the insect trap. As described herein, the electrostatic probe may use a relatively high negative voltage output or a relatively high positive voltage output to generate the electrostatic field at or near a terminal that is insulated to prevent damage to the insect specimen. In this way, the electrostatic probe, and/or an insect trap or trap system controller that utilizes such an electrostatic probe, enables relatively safe and simple handling or positioning of the insect specimen (or a plurality of insect specimens).

Furthermore, an insect trap analysis system that utilizes one or more electrostatic probes, as described herein, may collect (e.g., remotely or locally) insect specimens, detect the insect specimens within an enclosure, position the insect specimens without damaging the insect specimens (e.g., to permit capture of a plurality of images of the insect specimens), gather information associated with the insect specimens (e.g., capture images of the insect specimens from various angles, using various wavelengths, and/or the like), and/or provide the gathered information to a remote server device for further analysis.

Figure 1B:
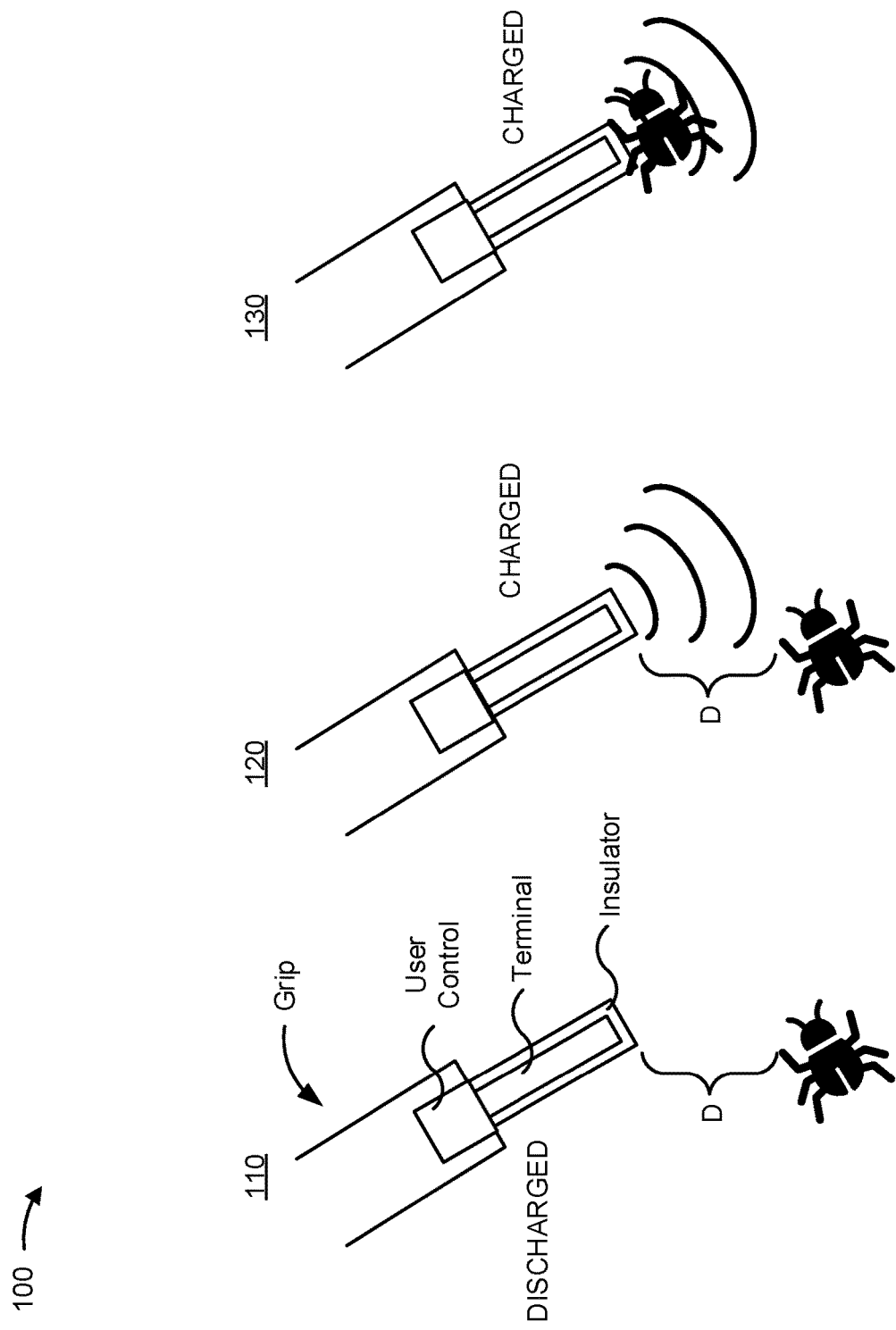

FIGS. 1A and 1B are diagrams of an example implementation 100 described herein. Example implementation 100 includes an example electrostatic probe, circuitry of the example electrostatic probe, and an example use of the example electrostatic probe. As described herein, the electrostatic probe may be used to attract, hold, transfer, and/or reposition an insect specimen, though the electrostatic probe may be used to move other types of targets (e.g., dust, non-insect animal specimens, and/or the like).

As shown in FIG. 1A, the electrostatic probe includes a grip, a user control, a terminal, and an insulator. The grip may include any suitable portion to permit a user to hold the electrostatic probe (e.g., with the user's hand). In some implementations, the electrostatic probe may be configured (e.g., shaped and/or sized) similar to a pen or other type of utensil. The user control and/or terminal may correspond to components of the circuitry of the electrostatic probe. The insulator may be any suitable insulator that has a particular configuration to prevent an insect specimen from being damaged when attracted to and/or when touching the electrostatic probe. For example, the insulator may insulate the insect specimen from a charge arcing and/or translating from the terminal to the insect specimen, from heat of the terminal (which may burn the insect specimen), and/or the like. The insulator may include any type of plastic or other type of non-conductive material.

The circuitry of the electrostatic probe includes a power supply (shown as a battery, such as a 9 volt (V) battery), a switch, an ion generator, and a discharge resistor (R1). The power supply may be used to power the ion generator (which may require one watt (W) or less of power) and/or discharge the electrostatic probe via the discharge resistor. As shown, the switch may be a three position switch that has an ON position, an OFF position, and a DISCHARGE position. In the OFF position (shown), the power supply is not supplying power to the ion generator or the discharge resistor. Accordingly, the power supply of the electrostatic probe may be off to disconnect power from the ion generator.

In the ON position, the switch connects the power supply to the ion generator to permit the ion generator to generate an output voltage ($V_{out}$), which corresponds to and/or is communicatively coupled to the terminal of the electrostatic probe. The ion generator may be a negative ion generator. In such cases, the output voltage may create negative ions that produce a buildup of an electric charge (e.g., a negative electric charge or a positive electric charge) around the insulated terminal. For example, the insulator may prevent arcing within the electrostatic field (e.g., with air molecules or other substances) and causes the electrostatic field to be created and/or maintained around the handling end. In some implementations, the ion generator may be configured to generate a electrostatic field that is focused and/or localized at a particular point of the handling end (e.g., a tip of the handling end). In some implementations, the output voltage may be a relatively high negative voltage (e.g., −250 V to −9500 V) with respect to the supply voltage (V s) of the power supply. In this way, the output voltage from the ion generator, when supplied to the terminal, may cause the electrostatic probe to generate and/or induce negative ions to create an electric charge within the terminal that results in the electrostatic field around the terminal and/or toward a handling end of the electrostatic probe (e.g., an end of the electrostatic probe that includes the terminal).

In the DISCHARGE position, the switch connects the power supply to the discharge resistor, which is connected to the output voltage of the ion generator. Accordingly, the discharge resistor may be configured to discharge a electrostatic field that is being produced and/or generated by a voltage of the terminal.

The user control may include a component to permit the user to control the position of the switch that is positioned on the electrostatic probe to permit a user to press and/or slide the switch into a particular position while holding the electrostatic probe (e.g., to enable one-handed control of the electrostatic probe). For example, the switch may be positioned on the electrostatic probe in a location relative to the grip to permit an index finger of a user to interact with the electrostatic probe, turn off the electrostatic probe, and/or discharge the electrostatic probe. In this way, the user may be able to quickly and easily turn on the electrostatic probe, discharge a electrostatic field of the electrostatic probe, and/or turn off the electrostatic probe, as described herein.

As shown in FIG. 1B, and by reference number 110, the electrostatic probe is discharged, and an insect specimen is within a threshold distance "D" from the electrostatic probe. For example, the switch is in the discharged position and/or $V_{out}$ is less than a threshold voltage that can produce a electrostatic field to attract the insect specimen at the threshold distance. The threshold distance may correspond to a maximum distance (e.g., 1 centimeter (cm), 3 cm, 5 cm, and/or the like) from which an insect specimen within a electrostatic field that is produced by the electrostatic probe can be attracted to the electrostatic probe, as described herein. In some implementations, the threshold distance may be configurable (e.g., based on adjusting the output voltage from the ion generator of the electrostatic probe). Accordingly, although the insect specimen is within the threshold distance, when the electrostatic probe is discharged, the insect specimen will not be attracted to the electrostatic probe.

As further shown in FIG. 1B, and by reference number 120, the electrostatic probe is charged, and the insect specimen is within the threshold distance of the electrostatic probe. Accordingly, the electrostatic probe may produce and/or generate a electrostatic field from the terminal that causes the insect specimen to be attracted to the electrostatic probe.

As further shown in FIG. 1B, and by reference number 130, the electrostatic probe is charged and the insect specimen is attracted and/or held in contact at a handling end (e.g., in contact with the insulator) of the electrostatic probe. Accordingly, movement of the electrostatic probe may correspond to movement of the insect specimen, thus permitting a user to handle and/or position the insect specimen. To release (or drop) the insect specimen from the handling end of the electrostatic probe, the electrostatic probe and/or the electrostatic field of the electrostatic probe can be discharged (e.g., the user may place the switch in the discharge position), which ceases the attraction of the insect specimen to the electrostatic probe.

In this way, an electrostatic probe may be configured to permit a user to relatively easily, in comparison to previous techniques, handle and/or position an insect specimen without damaging (or with relatively minimal damage when compared with previous techniques) the insect specimen. Additionally, or alternatively, as described herein, a similar electrostatic probe may be mechanically coupled with a mechanical device (e.g., a robotic arm) to permit the mechanical device to handle and/or position the insect specimen.

As indicated above, FIGS. 1A and 1B are provided merely as one or more examples. Other examples may differ from what is described with regard to FIG. 1.

Figure 2:
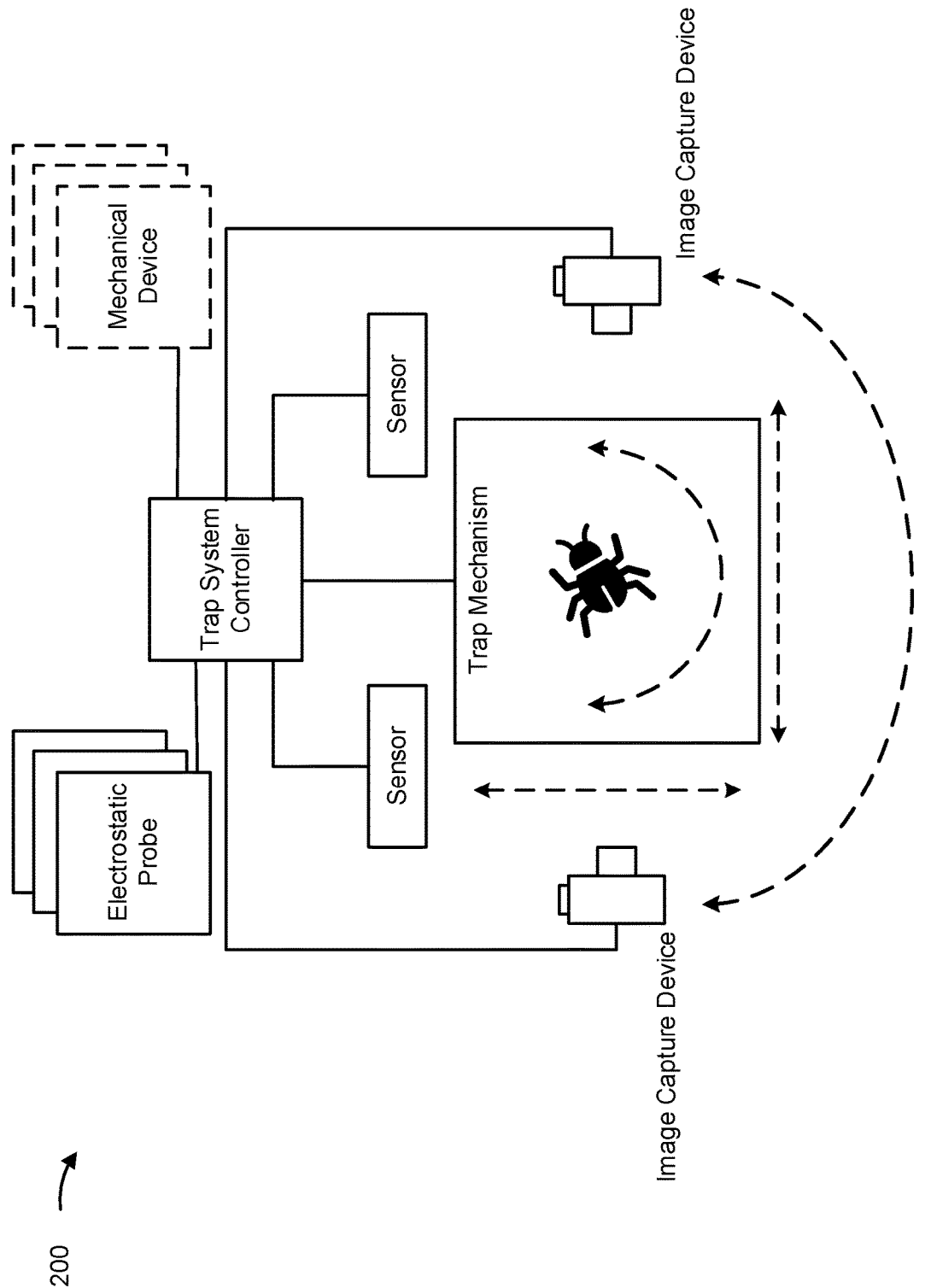
FIG. 2 is a diagram of an example implementation of a specimen analysis system described herein.

FIG. 2 is a diagram of an example implementation 200 described herein. Example implementation 200 may include an insect trap analysis system with a trap system controller, a trap mechanism, one or more electrostatic probes, one or more sensors, one or more image capture devices, and/or one or more mechanical devices. As described herein, the trap system controller may use the trap mechanism to capture one or more insects, may use the one or more sensors to detect specimens of the one or more insects (referred to herein individually as "insect specimen" or collectively as "insect specimens") in the trap mechanism, may use the image capture devices to capture images of an insect specimen, and may use the one or more electrostatic probes to adjust a position of the insect specimen, the one or more mechanical devices to adjust a position of the insect specimen (e.g., by adjusting a position of the trap mechanism) and/or a position of one or more of the image capture devices, and/or a position of one or more of the sensors.

The trap mechanism may include any suitable device capable of trapping an insect and/or holding an insect specimen for analysis. For example, the trap mechanism may include an enclosure (e.g., a net, a solid enclosure, and/or the like) that is configured to prevent a captured insect from escaping the trap mechanism. In some implementations, the trap mechanism may be a component of an insect trap associated with the insect trap analysis system of example implementation 200. For example, the insect trap may include an enclosure and/or housing that holds the devices and/or components of the insect trap analysis system of example implementation 200.

The one or more sensors of FIG. 2 may include any suitable sensor capable of detecting an insect specimen on or within the trap mechanism. For example, the sensor may include a motion sensor, an infrared sensor, a bioluminescent sensor, a microphone (capable of detecting vibrations on or within the trap mechanism), a temperature sensor, and/or the like. Additionally, or alternatively, the one or more sensors may be configured to monitor temperature, humidity, barometric pressure, and/or other characteristics of an environment of the trap. Accordingly, based on a signal from the one or more sensors indicating a change in the environment, atmosphere, contents, and/or makeup of the trap mechanism, the trap system controller can detect that an insect specimen is on or within the trap mechanism.

In some implementations, the one or more sensors may be configured to monitor for and/or detect particular levels of fluorescence emitted from insect specimens (e.g., mosquito specimens). Additionally, or alternatively, the level of fluorescence may be monitored and/or detected in images of the insect specimens (e.g., via a digital image processing technique or model configured to detect the fluorescence). Such fluorescence may be incited by a particular wavelength of light (e.g., from a light source of the insect trap and/or a light source controlled by trap system controller) and/or caused by a fluorescence tagged dust, a fluorescence tagged food that may have been ingested by the insect, and/or by bacteria emitting radiation or light from within a transparent segment of the insect. Certain levels of the fluorescence may correspond to particular species of the insect specimen (e.g., which may be naturally evolved insect specimens or genetically modified insect specimens). In some implementations, the certain levels of fluorescence may indicate one or more other characteristics of the insect specimen, such as whether the insect specimen has been modified in any particular way (e.g., to be a particular gender, to be sterile, and/or the like). Accordingly, a level of fluorescence emitted from the insect specimen can indicate one or more characteristics of the insect specimen. Based on the level of fluorescence, the trap system controller can identify the genus, species, and/or gender of the insect and/or other characteristics of the insect specimen (e.g., source, modifications, diseases associated with the insect specimen, and/or the like) using a mapping of signals from the one or more sensors to corresponding characteristics.

The one or more mechanical devices may include any suitable devices capable of mechanically adjusting a position of a component of the insect trap analysis system. The one or more mechanical devices may include one or more actuators, gears, ratchets, cams, levers, springs, rollers, and/or the like. The one or more mechanical devices may be controlled via one or more wired or wireless communication signals from the trap system controller.

The one or more mechanical devices may be configured to move one or more of the trap mechanism, the one or more sensors, the one or more image capture devices, an examination platform of the trap mechanism (e.g., via one or more vibration mechanisms), and/or the like. For example, the one or more mechanical devices may be mechanically connected to (e.g., via one or more interconnects, mounts, fasteners, and/or the like) an electrostatic probe such that movement of the one or more mechanical devices corresponds to movement of the electrostatic probe. Additionally, or alternatively, the one or more mechanical devices may be mechanically coupled to the examination platform, the one or more sensors, and/or the one or more image capture devices such that movement of the one or more mechanical devices causes corresponding movement of the trap mechanism, the one or more sensors, and/or the one or more image capture devices.

In some implementations, the trap system controller may control the one or more mechanical devices based on detecting an insect specimen on or within the trap mechanism. For example, the trap system controller, using one or more signals from a sensor and/or one or more images from an image capture device, may determine that an insect specimen is on or within the trap mechanism, identify the location of the insect specimen relative to the trap mechanism, relative to an electrostatic probe, relative to other insect specimens, and/or the like and correspondingly control the electrostatic probe and/or mechanical devices to adjust a position of the insect specimen. Additionally, or alternatively, the trap system controller may determine location of the insect specimen relative to the image capture devices, and control the mechanical devices to adjust a position (e.g., a vertical position, a horizontal position, a pitch, an orientation, and/or the like) of the trap mechanism and/or a position of one or more of the image capture devices.

In this way, the trap system controller may cause the one or more mechanical devices to adjust a position of the insect specimen relative to one or more of the image capture devices associated with the insect trap by adjusting a position of the trap mechanism and/or the image capture devices. Accordingly, the trap system controller may permit the image capture devices to capture the insect specimen from a variety of different angles. Having a plurality of images of a same insect specimen that are captured from a variety of different angles of a same insect specimen, rather than a single image of the insect specimen from a single angle, can permit a model (e.g., an insect analysis model) to more accurately analyze, identify, and/or classify the insect specimen (e.g., according to taxonomy, species, sex, transgenic status, infection status, health status, and/or the like).

The one or more image capture devices may include any suitable device that is capable of capturing images of the trap mechanism. For example, an image capture device may include a camera, a cluster of photosensitive pixel sensors, and/or the like. In some implementations, one or more of the image capture devices may include a camera of a mobile device (e.g., a smartphone), and/or a camera of a device associated with the trap system controller (e.g., a device that houses the trap system controller).

In some implementations, the trap system controller may cause the image capture device to capture a plurality of images of the insect specimen on the trap mechanism. For example, the trap system controller may cause the one or more image capture devices to capture the plurality of images while the trap system controller is controlling the one or more mechanical devices to enable the plurality of images to be captured from different angles. In such cases, the trap system controller may append metadata to each of the plurality of images that includes position information (e.g., one or more sets of coordinates relative to the insect trap, one or more rotational positions of the mechanical devices, and/or the like) of the one or more mechanical devices that identifies a configuration of the one or more mechanical devices at the moment each of the plurality of images was captured.

The trap system controller may perform one or more actions associated with the plurality of images. In some implementations, the trap system controller may transmit the plurality of images to a server device (e.g., a server device that includes a model to analyze the plurality of images to determine one or more characteristics of the insect specimen). Additionally, or alternatively, the trap system controller may locally store the plurality of images for later retrieval and/or later analysis. In this way, the insect trap analysis system may enable real-time capture and/or analysis of insect specimens of an insect trap.

In some implementations, the trap system controller may perform a processing of the plurality of images (e.g., before transmitting or storing the images). For example, the trap system controller may process a plurality of images received from one or more image capture devices to identify a particular insect specimen from a plurality of insect specimens on or within the trap mechanism. More specifically, the trap system controller may identify a same insect specimen within each of the plurality of images by determining a location of the insect specimen relative to the trap mechanism. In some implementations, the location of the insect mechanism may be determined based on coordinates and/or a position of the one or more mechanical devices at the time the respective images were captured. For example, using triangulation and/or one or more analyses, the insect specimen can be located on the trap mechanism and corresponding coordinates of the location of insect specimen on the trap mechanism can be applied to the various images of the plurality of images. In this way, the trap system controller may identify representations of the insect specimen in each of the plurality of images (e.g., using a digital image processing technique, a computer vision technique, and/or the like) based on respective configurations of the one or more mechanical devices when each of the plurality of images was captured.

In some implementations, the trap system controller may perform a digital image processing of the plurality of images to enhance the representations of the insect specimen and/or generate one or more enhanced representations of the insect specimen. For example, the trap system controller may process (e.g., edit, zoom, crop, brighten, adjust contrast, and/or the like) the plurality of images to generate an enhanced representation of the insect specimen (e.g., such as a three-dimensional representation) using one or more image processing models. Accordingly, the trap system controller can provide one or more enhanced representations of the insect specimen to a server device for further analysis.

The trap system controller may sort and/or organize the plurality of captured images. For example, the trap system controller may sort and/or organize the plurality of images according to each insect specimen of the plurality of insect specimens on or within the trap mechanism. In such cases, the trap system controller may assign an identifier to the insect specimen and map the plurality of images and/or other information associated with the insect specimen (e.g., date/time information, trap location information, and/or the like) associated with the insect specimen using the identifier and the location of the insect specimen. In this way, the plurality of images may be configured into a structured data set (which can later be analyzed and/or provided to a server device for analysis). In this way, the trap system controller may distinguish each insect specimen from other insect specimens of the plurality of insect specimens and aggregate the representations into the enhanced representation based on being associated with the first insect specimen.

Accordingly, the insect trap analysis system of example implementation 200 may enable real-time, remote surveillance of insect specimens within insect traps, and/or enable positioning or repositioning of one or more insect specimens to permit the insect specimens to be analyzed via images of the insect specimen. Furthermore, the insect trap analysis system may include one or more components that can generate a set of images of insect specimens, a preprocessed set of images, and/or enhanced representations of an insect specimen to permit a server device to more accurately analyze the insect specimen.

As indicated above, FIG. 2 is provided merely as one or more examples. Other examples may differ from what is described with regard to FIG. 2.

Figure 3A:
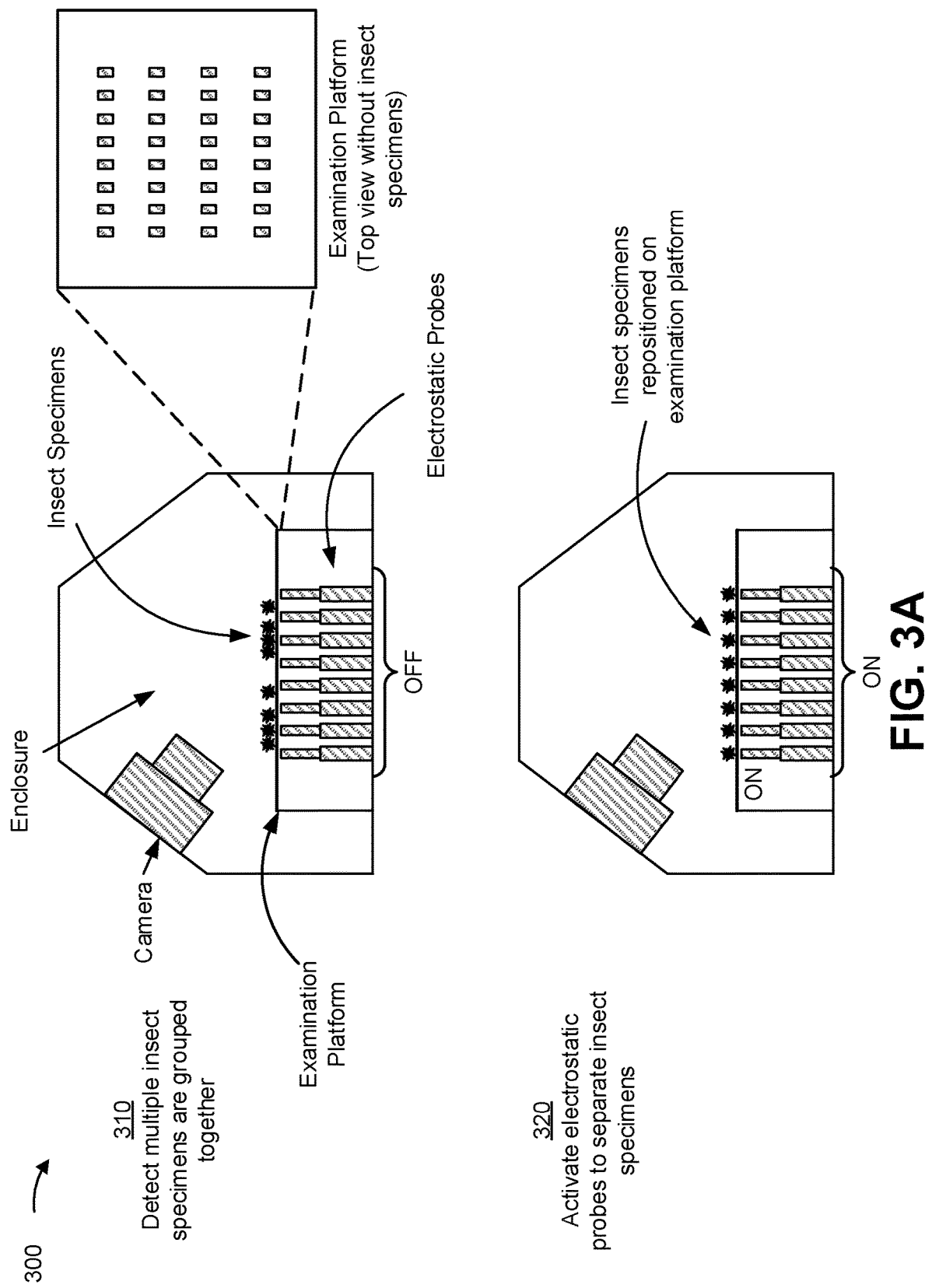
FIGS. 3A-3C are diagrams of one or more example implementations described herein.
Figure 3B:
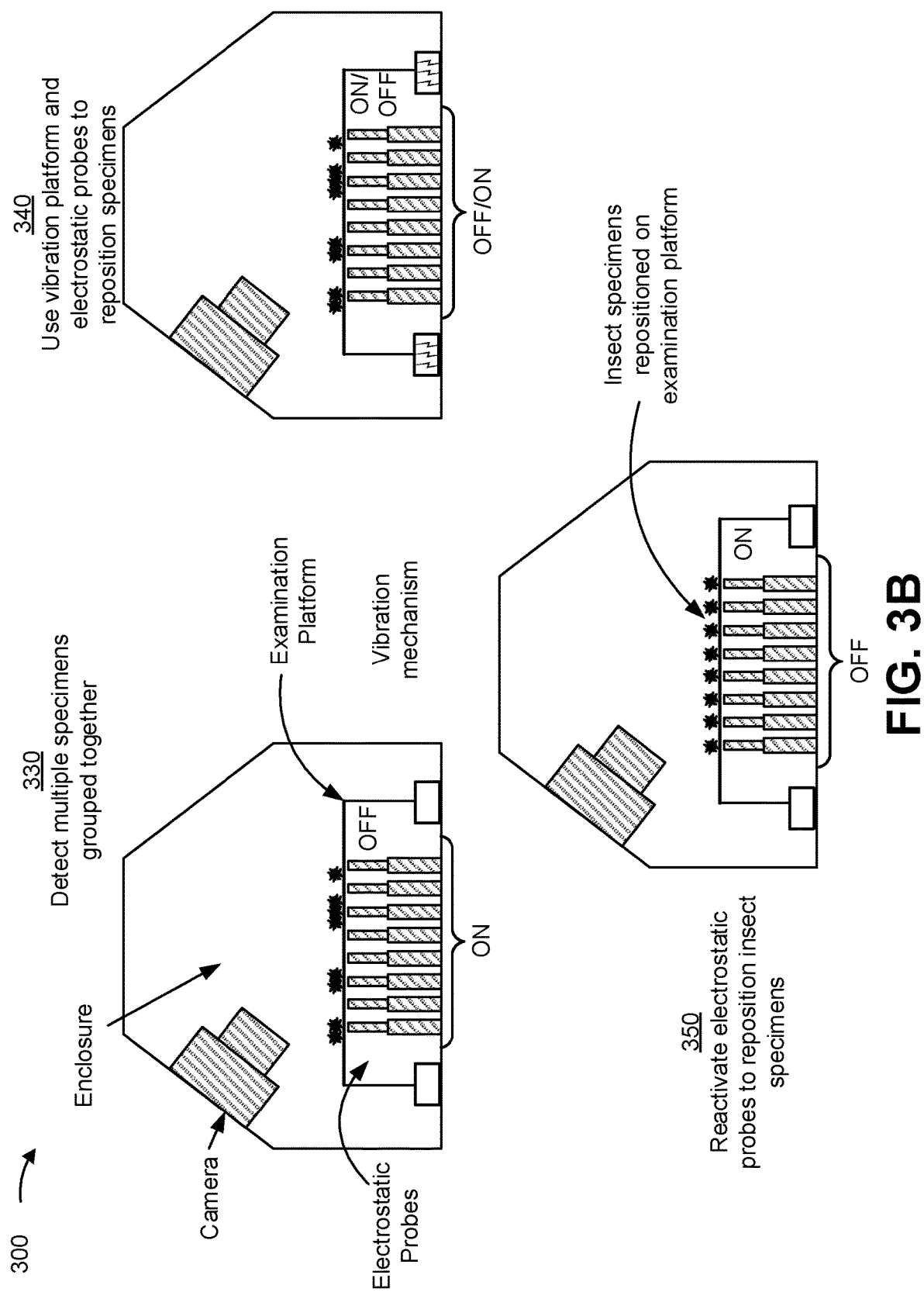
Figure 3C:
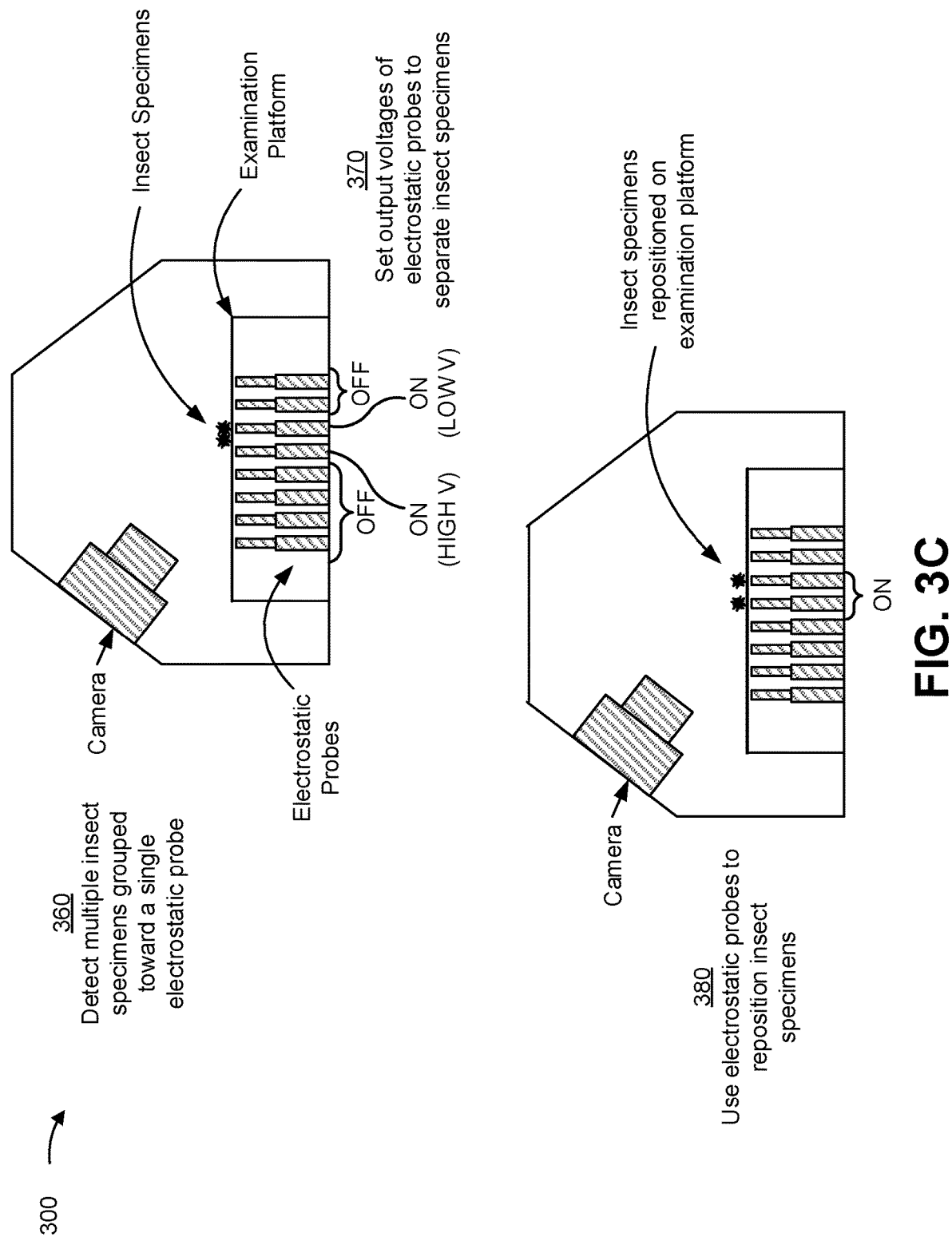

FIGS. 3A-3C are diagrams of an example implementation 300 described herein. Example implementation 300 includes a trap mechanism (e.g., corresponding to the trap mechanism of example implementation 200) that includes an enclosure, an examination platform, a camera, and one or more electrostatic probes (referred to herein individually as "electrostatic probe" and collectively as "electrostatic probes"). As shown, the electrostatic probes may be configured in a particular pattern and/or array so as to enable a trap system controller of the trap mechanism to adjust a position of insect specimens on the examination platform. For example, the trap system controller may activate (e.g., by causing the electrostatic probes to have particular output voltages) the electrostatic probes to cause the insect specimens to be attracted to positions of the electrostatic probes. Accordingly, the insect specimens may be separated into groups (e.g., to permit a quantity of insect specimens to more accurately be determined relative to the insect specimen being randomly distributed across the examination platform) and/or separated from each other (e.g., to permit a relatively more accurate analysis of the individual insect specimens).

In example implementation 300, the examination platform may serve as an insulator between individual terminals (e.g., terminals that are charged by one or more ion generators coupled to the electrostatic probes, as described herein) of the electrostatic probe. Accordingly, the electrostatic probes may be controlled to adjust a position of the insect specimens on the examination platform without damaging the insect specimens.

As shown in FIG. 3A, and by reference number 310, the trap system controller may determine (e.g., from images of the camera) that multiple insect specimens are grouped together. For example, based on an image processing technique that is configured to detect multiple insect specimens in a group that has a threshold (e.g., a threshold width, or a threshold diameter), the trap system controller may determine that a group of insect specimens are present on the examination platform. Such a group may indicate that a threshold quantity of insect specimens are on the examination platform.

As further shown in FIG. 3A, and by reference number 320, the trap system controller may activate the electrostatic probes to separate the insect specimens. For example, based on detecting that there are multiple insect specimens grouped together on the examination platform, the trap system controller may determine that the insect specimens are to be separated. Accordingly, the trap system controller may control the electrostatic probes to generate respective electrostatic fields to separate (e.g., individually attract) the insect specimens to individual electrostatic probes (or separate electrostatic probes). In this way, the insect specimens may be organized and/or separated from groups to permit the camera to capture clearer images of the individual insect specimens (e.g., because groups of insect specimens may prevent the images from providing a view of some insect specimens).

As shown in FIG. 3B, and by reference number 330, the trap system controller detects multiple insect specimens grouped together. For example, the trap system controller may detect that multiple specimens are grouped together in a similar manner as described above. As shown, the trap mechanism in FIG. 3B may include one or more vibration mechanisms (e.g., any suitable mechanical device that can be used to vibrate the examination platform).

As further shown in FIG. 3B, and by reference number 340, the trap system controller may use the vibration platform and electrostatic probes to reposition the insect specimens. For example, the trap system controller may iteratively perform a process involving activating/discharging the electrostatic probes and/or vibrating the examination platform until the multiple insect specimens are not grouped together. More specifically, the trap system controller may activate the electrostatic probes and analyze an image of the insect specimens on the examination platform, determine whether the image depicts multiple specimens in a group of a threshold size. Further, if the trap system controller determines that the image does depict multiple specimens in in such a group, the trap system controller may discharge the electrostatic probes and cause the one or more vibration mechanisms to cause the insect specimens to be repositioned or separated from each other (or the group). Such a process can be repeated until there are no groups of insect specimens that are greater than the threshold size (or quantity).

As further shown in FIG. 3B, and by reference number 350, the trap system controller reactivates the electrostatic probes to reposition the insect specimens in positions corresponding to positions of the electrostatic probes. After reactivating the probes, the trap system controller may determine whether a group of insect specimens satisfies a threshold size, and if so, may cause the one or more vibration mechanisms to vibrate the examination platform to separate the insect specimens, as described above. Accordingly, such a process can be repeated until no more than one insect specimen is determined to be at a position of an electrostatic probe or until less than a threshold number of insect specimens are at a position of an electrostatic probe.

In this way, the trap system controller may use the electrostatic probes in combination with one or more vibration mechanisms (and/or other similar mechanical types of mechanical devices) to separate and/or reposition insect specimens on an examination platform of a trap mechanism.

As shown in FIG. 3C, and by reference number 360, the trap system controller detects that multiple insect specimens are grouped toward (or at) a position of a single electrostatic probe. As described herein, the trap system controller may individually control output voltages of the electrostatic probes to cause the electrostatic probes to separate the insect specimens from each other.

In the example of FIG. 3C, two insect specimens may be grouped together on the examination platform. The trap system controller may analyze an image from the camera to determine that insect specimens are located at positions corresponding to particular electrostatic probes and activate the electrostatic probes to separate the insect specimens. Furthermore, the trap system controller may cause the other electrostatic probes to be discharged and/or off (e.g., to prevent the insects from being attracted to the other electrostatic probes). In some implementations, the trap system may individually control the other electrostatic probes to be generate electrostatic fields, as described herein, to assist with separating the insect specimens.

In this way, the trap system controller may detect a group of insect specimens are positioned near or at a same electrostatic probe.

As further shown in FIG. 3C, and by reference number 370, the trap system controller may set output voltages of the electrostatic probes to separate the insect specimens. For example, to separate the insect specimens, the trap system controller may set the electrostatic probes to have different output voltages (e.g., one that is higher than the other). More specifically, the electrostatic probe that has a higher negative output voltage may produce a stronger electrostatic field that can separate one of the insect specimens from the other. Meanwhile, the trap system controller may control another electrostatic probe to output a relatively lower negative output voltage that can attract and/or hold the insect specimen that is closer to the electrostatic probe that is outputting the lower negative output voltage.

As further shown in FIG. 3C, and by reference number 380, the trap system controller uses the electrostatic probes to reposition the insect specimens and/or hold the insect specimens in positions on the examination platform corresponding to positions of the electrostatic probes.

In this way, the trap system controller may individually control output voltages of the individual electrostatic probes to cause insect specimens to separate from each other and/or from a group of insect specimens (and/or other debris or items in the trap mechanism).

As indicated above, FIGS. 3A-3C are provided merely as one or more examples. Other examples may differ from what is described with regard to FIGS. 3A-3C.

FIG. 4 is a diagram of an example implementation 400 described herein. In example implementation 400, an electrostatic probe may be attached (e.g., fastened, connected, fit, and/or the like) to a robotic arm that may be used to reposition and/or transport insect specimens in an enclosure (or trap).

The robotic arm may be controlled by a trap system controller (e.g., the trap system controller of FIG. 2), as described herein, to move and/or organize the insect specimens. For example, as shown by reference number 410, insect specimens may be randomly distributed at the base of the enclosure (e.g., according to where the insect specimens were when the insect specimens died, according to the insect specimens being moved by live insects or other natural occurrences, and/or the like). As shown by reference number 420, the trap system controller may use the robotic arm to separate the insect specimens into quadrants A, B, C, and D of the enclosure. In some implementations, the trap system controller may be configured to use the robotic arm to sort the insect specimens according to individual characteristics of the insect specimens (e.g., taxonomy, species, sex, transgenic status, infection status, health status, and/or the like). Additionally, or alternatively, a user may manually operate the robotic arm (e.g., using a control console, which may or may not be remotely located from the enclosure and/or robotic arm of example implementation 400.

In this way, an electrostatic probe, as described herein, may be used in association with a robotic arm to handle and/or position insect specimens.

As indicated above, FIG. 4 is provided merely as one or more examples. Other examples may differ from what is described with regard to FIG. 4.

Figure 5:
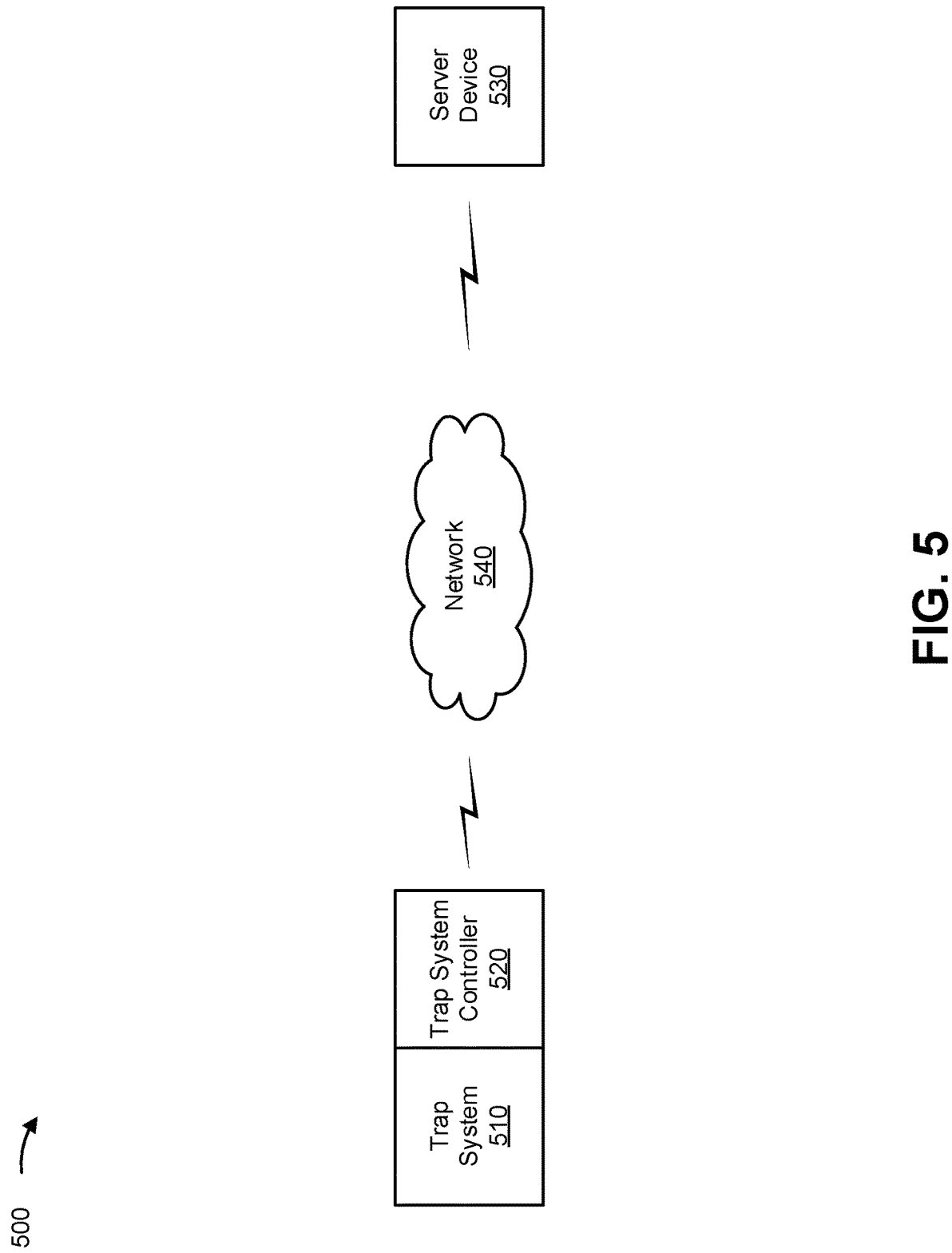
FIG. 5 is a diagram of an example environment in which systems and/or methods described herein may be implemented.

FIG. 5 is a diagram of an example environment 500 in which systems and/or methods described herein may be implemented. As shown in FIG. 5, environment 500 may include a trap system 510 with a trap system controller 520, a server device 530, and a network 540. Devices of environment 500 may interconnect via wired connections, wireless connections, or a combination of wired and wireless connections.

Trap system 510 includes any suitable combination of electrical and/or mechanical components to collect insect specimens as described herein. For example, trap system 510 may include one or more motors, one or more actuators, one or more control devices, one or more sensors, one or more image capture devices, and/or the like. Trap system controller 520 may include one or more devices capable of receiving, generating, storing, processing, and/or providing information associated with controlling trap system 510. For example, trap system controller 520 may include a communication device and/or a computing device, such as a computer, a mobile device (e.g., a smartphone, a dedicated mobile trap monitoring device, and/or the like), or a similar type of device. Trap system 510 and trap system controller 520 may be combined to form an insect trap analysis system described herein.

Server device 530 includes one or more devices capable of storing, processing, and/or routing information associated with insect specimens captured by trap system 510 and/or processed by trap system controller 520. In some implementations, server device 530 may include a communication interface that allows server device 530 to receive information from and/or transmit information to other devices in environment 500.

Network 540 includes one or more wired and/or wireless networks. For example, network 540 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 5 are provided as one or more examples. In practice, there may be additional devices and/or networks, fewer devices and/or networks, different devices and/or networks, or differently arranged devices and/or networks than those shown in FIG. 5. Furthermore, two or more devices shown in FIG. 5 may be implemented within a single device, or a single device shown in FIG. 5 may be implemented as multiple, distributed devices. Additionally, or alternatively, a set of devices (e.g., one or more devices) of environment 500 may perform one or more functions described as being performed by another set of devices of environment 500.

Figure 6:
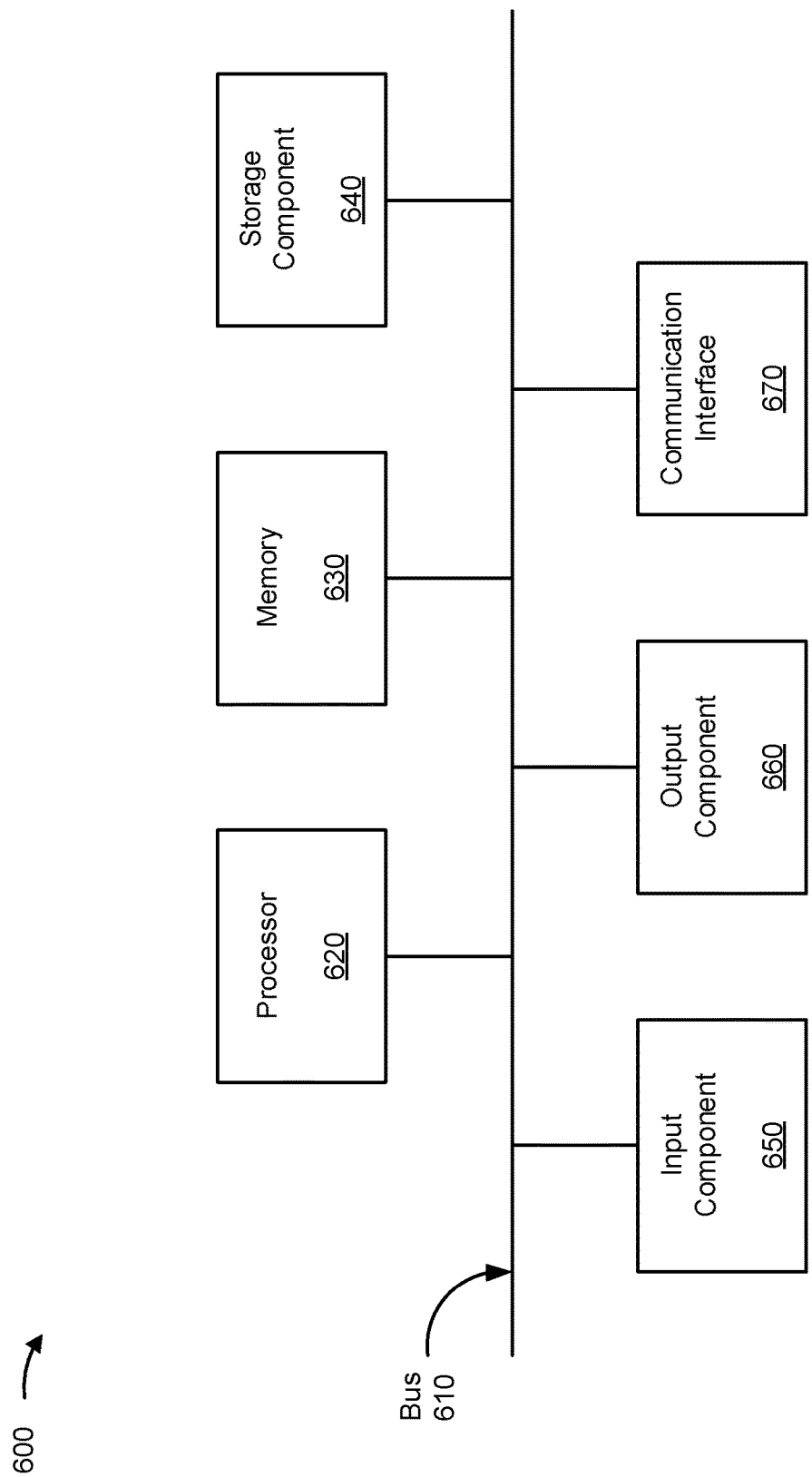
FIG. 6 is a diagram of example components of one or more devices of FIG. 5.

FIG. 6 is a diagram of example components of a device 600. Device 600 may correspond to trap system controller 520 and/or server device 530. In some implementations, trap system controller 520 and/or server device 530 may include one or more devices 600 and/or one or more components of device 600. As shown in FIG. 6, device 600 may include a bus 610, a processor 620, a memory 630, a storage component 640, an input component 650, an output component 660, and a communication interface 670.

Bus 610 includes a component that permits communication among multiple components of device 600. Processor 620 is implemented in hardware, firmware, and/or a combination of hardware and software. Processor 620 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 620 includes one or more processors capable of being programmed to perform a function. Memory 630 includes a random access memory (RAM), a read only memory (ROM), and/or another type of dynamic or static storage device (e.g., a flash memory, a magnetic memory, and/or an optical memory) that stores information and/or instructions for use by processor 620.

Storage component 640 stores information and/or software related to the operation and use of device 600. For example, storage component 640 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 650 includes a component that permits device 600 to receive information, such as via user input (e.g., a touch screen display, a keyboard, a keypad, a mouse, a button, a switch, and/or a microphone). Additionally, or alternatively, input component 650 may include a component for determining location (e.g., a global positioning system (GPS) component) and/or a sensor (e.g., an accelerometer, a gyroscope, an actuator, another type of positional or environmental sensor, and/or the like). Output component 660 includes a component that provides output information from device 600 (via, e.g., a display, a speaker, a haptic feedback component, an audio or visual indicator, and/or the like).

Communication interface 670 includes a transceiver-like component (e.g., a transceiver, a separate receiver, a separate transmitter, and/or the like) that enables device 600 to communicate with other devices, such as via a wired connection, a wireless connection, or a combination of wired and wireless connections. Communication interface 670 may permit device 600 to receive information from another device and/or provide information to another device. For example, communication interface 670 may include an Ethernet interface, an optical interface, a coaxial interface, an infrared interface, a radio frequency (RF) interface, a universal serial bus (USB) interface, a Wi-Fi interface, a cellular network interface, and/or the like.

Device 600 may perform one or more processes described herein. Device 600 may perform these processes based on processor 620 executing software instructions stored by a non-transitory computer-readable medium, such as memory 630 and/or storage component 640. As used herein, the term "computer-readable medium" refers to a non-transitory memory device. A memory device includes memory space within a single physical storage device or memory space spread across multiple physical storage devices.

Software instructions may be read into memory 630 and/or storage component 640 from another computer-readable medium or from another device via communication interface 670. When executed, software instructions stored in memory 630 and/or storage component 640 may cause processor 620 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 6 are provided as an example. In practice, device 600 may include additional components, fewer components, different components, or differently arranged components than those shown in FIG. 6. Additionally, or alternatively, a set of components (e.g., one or more components) of device 600 may perform one or more functions described as being performed by another set of components of device 600.

Figure 7:
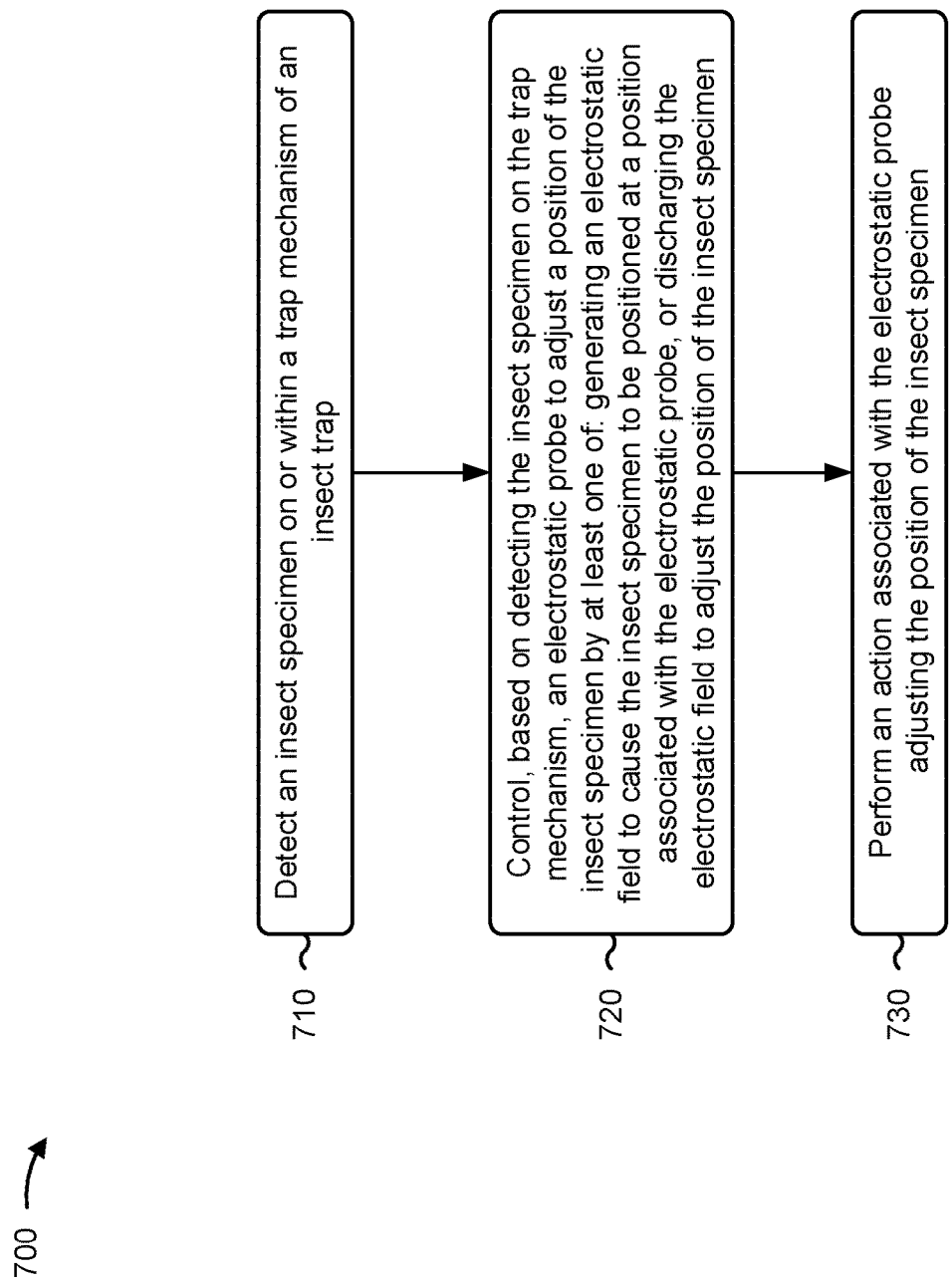
FIG. 7 is a flowchart of an example process associated with an electrostatic probe for handling or positioning a specimen.

FIG. 7 is a flowchart of an example process 700 associated with an electrostatic probe for handling or positioning a specimen. In some implementations, one or more process blocks of FIG. 7 may be performed by a trap system controller (e.g., trap system controller 520). In some implementations, one or more process blocks of FIG. 7 may be performed by another device or a group of devices separate from or including the trap system controller, such as a trap system (e.g., trap system 510 and/or components of trap system 510, such as an electrostatic probe), a server device (e.g., server device 530), and/or the like.

As shown in FIG. 7, process 700 may include controlling, based on detecting the insect specimen on the trap mechanism, an electrostatic probe to adjust a position of the insect specimen by generating a electrostatic field to cause the insect specimen to be positioned at a position associated with the electrostatic probe (block 710). For example, the trap system controller (e.g., using processor 620, memory 630, storage component 640, input component 650, output component 660, communication interface 670 and/or the like) may control, based on detecting the insect specimen on the trap mechanism, a static probe to adjust a position of the insect specimen by generating a electrostatic field to cause the insect specimen to be positioned at a position associated with the electrostatic probe, as described above.

As further shown in FIG. 7, process may include controlling, based on detecting the insect specimen on the trap mechanism, an electrostatic probe to adjust a position of the insect specimen by at least one of: generating a electrostatic field to cause the insect specimen to be positioned at a position associated with the electrostatic probe, or discharging the electrostatic field to adjust the position of the insect specimen (block 720). For example, the trap system controller (e.g., using processor 620, memory 630, storage component 640, input component 650, output component 660, communication interface 670 and/or the like) may control, based on detecting the insect specimen on the trap mechanism, an electrostatic probe to adjust a position of the insect specimen by at least one of: generating a electrostatic field to cause the insect specimen to be positioned at a position associated with the electrostatic probe, or discharging the electrostatic field to adjust the position of the insect specimen, as described above.

As further shown in FIG. 7, process 700 may include performing an action associated with the electrostatic probe adjusting the position of the insect specimen (block 730). For example, the trap system controller (e.g., using processor 620, memory 630, storage component 640, input component 650, output component 660, communication interface 670 and/or the like) may perform an action associated with the electrostatic probe adjusting the position of the insect specimen, as described above.

Process 700 may include additional implementations, such as any single implementation or any combination of implementations described below and/or in connection with one or more other processes described elsewhere herein.

In a first implementation, the electrostatic probe includes an ion generator and the electrostatic field is generated by an output of the ion generator, the one or more processors, when controlling the electrostatic probe, are configured to activate the ion generator to cause the electrostatic probe to generate the electrostatic field. In a second implementation, alone or in combination with the first implementation, the position associated with the electrostatic probe corresponds to a position on an examination platform that is within a threshold distance of a static emitting end of the electrostatic probe. In a third implementation, alone or in combination with one or more of the first and second implementations, the insect specimen is detected based on the insect specimen being positioned on the examination platform.

In a fourth implementation, alone or in combination with one or more of the first through third implementations, process 700 includes determining, after controlling the electrostatic probe to generate the electrostatic field, that the insect specimen is not at the position of the electrostatic probe; controlling, based on determining that the insect specimen is not at the position of the electrostatic probe, the electrostatic probe to discharge the electrostatic field; controlling a vibration mechanism to vibrate an examination platform of the insect trap to reposition the insect specimen to a new position; and controlling the electrostatic probe to regenerate the electrostatic field to cause the insect specimen to be repositioned from the new position to the position of the electrostatic probe.

In a fifth implementation, alone or in combination with one or more of the first through fourth implementations, the insect specimen is a first insect specimen and the electrostatic probe is a first electrostatic probe, and, when determining that the insect specimen is not at the position of the electrostatic probe, the insect specimen is determined to be grouped with a second insect specimen at a position of a second electrostatic probe of the insect trap, and the trap system controller may control the first electrostatic probe to produce a first electrostatic field and control the second electrostatic probe to a produce a second electrostatic field to separate the first insect specimen from the second insect specimen, the first electrostatic probe is stronger than the second electrostatic field.

In a sixth implementation, alone or in combination with one or more of the first through fifth implementations, process 700 includes determining that the insect specimen has been repositioned to the position associated with the electrostatic probe, wherein the action is being performed based on determining that the insect specimen has been repositioned to the position associated with the electrostatic probe. In a seventh implementation, alone or in combination with one or more of the first through sixth implementations, process 700 includes causing an image capture device to capture an image of the insect specimen; and transmit or is storing the image for analysis of the insect specimen. In an eighth implementation, alone or in combination with one or more of the first through seventh implementations, process 700 includes transmit a notification is associating with the insect specimen to indicate that the insect specimen is positioned within the insect trap.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A electrostatic probe for positioning an insect specimen, the electrostatic probe comprising:
   an ion generator;
   a handling end; and
   a controller configured to:
      activate the ion generator to produce an electrostatic field at the handling end,
         wherein the electrostatic field is to attract the insect specimen to the handling end or hold the insect specimen at the handling end; and
      discharge the electrostatic field to cause the insect specimen to be released from the handling end.

2. The electrostatic probe of claim 1, wherein an output component of the ion generator is connected to a terminal of the handling end.

3. The electrostatic probe of claim 2, wherein the terminal is covered by an insulator that permits the insect specimen to be attracted to the handling end and minimize damage to the insect specimen.

4. The electrostatic probe of claim 1, wherein the controller is configured to activate the ion generator by supplying a voltage to the ion generator to cause the ion generator to output a voltage that generates the electrostatic field at the handling end.

5. The electrostatic probe of claim 1, wherein the controller comprises a switch that includes:
   an on position to activate the ion generator,
   a discharge position to discharge the ion generator, and
   an off position to disconnect a power supply from the ion generator.

6. The electrostatic probe of claim 1, wherein the controller includes a resistor to receive an output from the ion generator to discharge the electrostatic field.

7. The electrostatic probe of claim 1, wherein the controller is further configured to:
   detect the insect specimen,
      wherein the ion generator is activated based on detecting the insect specimen.

8. The electrostatic probe of claim 1, wherein the electrostatic probe is configured to be a handheld probe that permits a user to reposition the insect specimen without damaging the insect specimen.

9. The electrostatic probe of claim 1, wherein the ion generator is a negative ion generator.

10. The electrostatic probe of claim 1, wherein the ion generator is configured to build an electric charge in a terminal of the handling end,
   wherein an insulator associated with the terminal prevents arcing associated with the electrostatic field and the terminal.

11. A method associated with analyzing an insect specimen in an insect trap, comprising:
   detecting, by a device, the insect specimen on or within a trap mechanism of the insect trap;
   controlling, by the device and based on detecting the insect specimen on or within the trap mechanism, an electrostatic probe to adjust a position of the insect specimen by at least one of:
      generating an electrostatic field to cause the insect specimen to be positioned at a position associated with the electrostatic probe, or
      discharging the electrostatic field to cause the insect specimen to be released; and
   performing, by the device, an action associated with the electrostatic probe adjusting the position of the insect specimen.

12. The method of claim 11, wherein the electrostatic probe includes an ion generator and the electrostatic field is generated by an output of the ion generator,
   wherein controlling the electrostatic probe comprises activating the ion generator to cause the electrostatic probe to generate the electrostatic field.

13. The method of claim 11, wherein the position associated with the electrostatic probe corresponds to a position on an examination platform that is within a threshold distance of a static emitting end of the electrostatic probe.

14. The method of claim 13, wherein the insect specimen is detected based on the insect specimen being positioned on the examination platform.

15. The method of claim 11, further comprising:
   determining, after controlling the electrostatic probe to generate the electrostatic field, that the insect specimen is not at the position of the electrostatic probe;
   controlling, based on determining that the insect specimen is not at the position of the electrostatic probe, the electrostatic probe to discharge the electrostatic field;
   controlling a vibration mechanism to vibrate an examination platform of the insect trap to reposition the insect specimen to a new position; and
   controlling the electrostatic probe to regenerate the electrostatic field to cause the insect specimen to be repositioned from the new position to the position of the electrostatic probe.

16. The method of claim 15, wherein the insect specimen is a first insect specimen and the electrostatic probe is a first electrostatic probe,
   wherein, when determining that the insect specimen is not at the position of the electrostatic probe, the insect specimen is determined to be grouped with a second insect specimen at a position of a second electrostatic probe of the insect trap,
   the method further comprising:
      controlling the first electrostatic probe to produce a first electrostatic field; and
      controlling the second electrostatic probe to a produce a second electrostatic field to separate the first insect specimen from the second insect specimen,
         wherein the first electrostatic probe is stronger than the second electrostatic field.

17. The method of claim 11, further comprising:
   determining that the insect specimen has been repositioned to the position associated with the electrostatic probe,
      wherein the action is performed based on determining that the insect specimen has been repositioned to the position associated with the electrostatic probe.

18. The method of claim 11, wherein performing the action comprises:
   causing an image capture device to capture an image of the insect specimen; and
   transmitting or storing the image for analysis of the insect specimen.

19. The method of claim 11, wherein performing the action comprises:

transmitting a notification associated with the insect specimen to indicate that the insect specimen is positioned within the insect trap.

20. A device for analyzing an insect specimen in an insect trap, comprising:
one or more memories; and
one or more processors, communicatively coupled to the one or more memories, configured to:
detect the insect specimen on or within a trap mechanism of the insect trap;
control, based on detecting the insect specimen on or within the trap mechanism, an electrostatic probe to adjust a position of the insect specimen by at least one of:
generating an electrostatic field to cause the insect specimen to be positioned at a position associated with the electrostatic probe, or
discharging the electrostatic field to cause the insect specimen to be released; and
perform an action associated with the electrostatic probe adjusting the position of the insect specimen.

\* \* \* \* \*